Dec. 2, 1947.   G. W. WILKIN   2,431,719
HYDRAULIC POWER MECHANISM
Filed Oct. 28, 1940   9 Sheets-Sheet 3
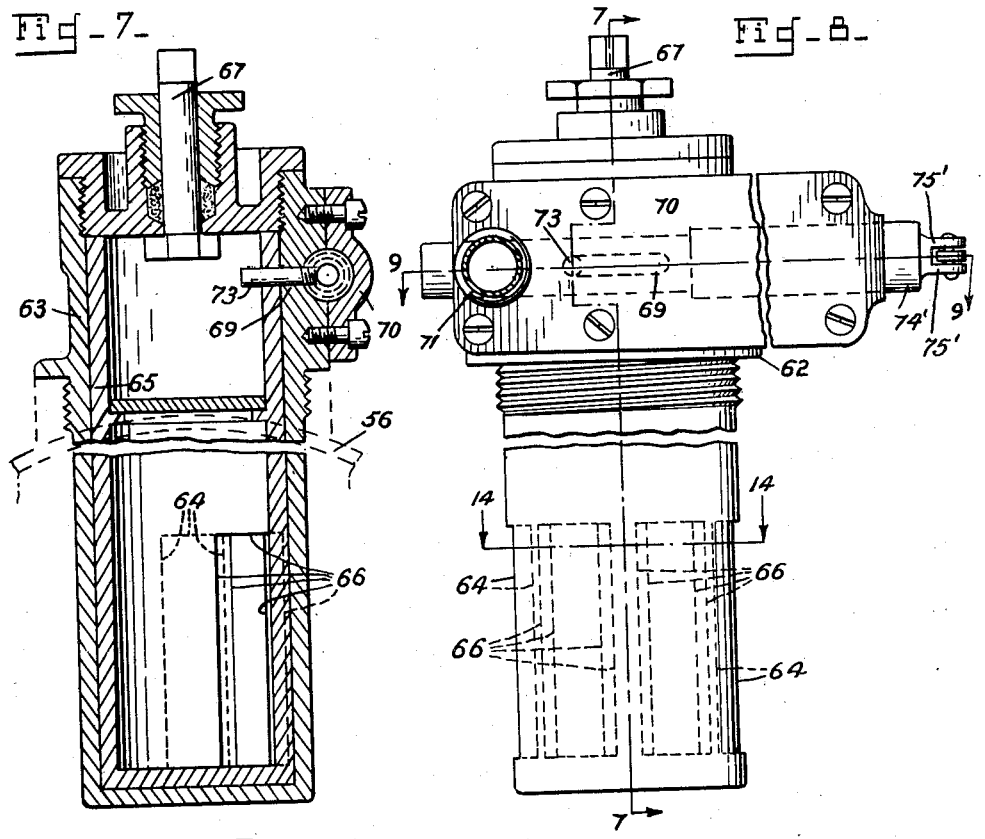
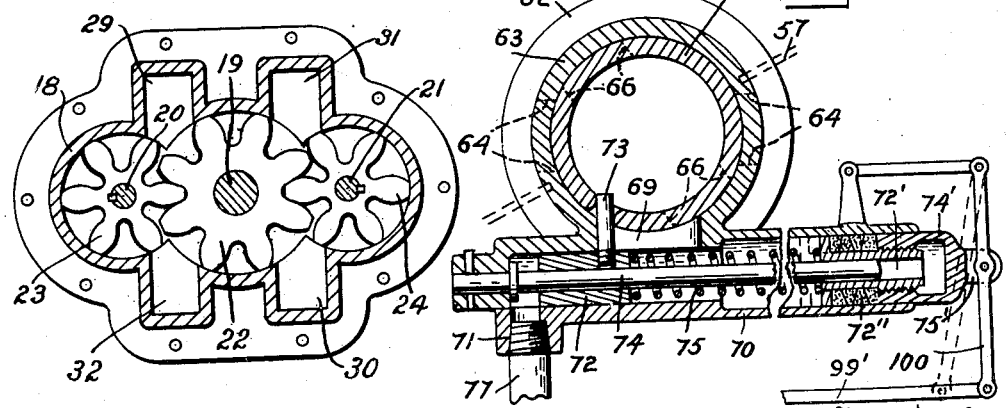
Inventor:
George W. Wilkin;
By
Attorney.

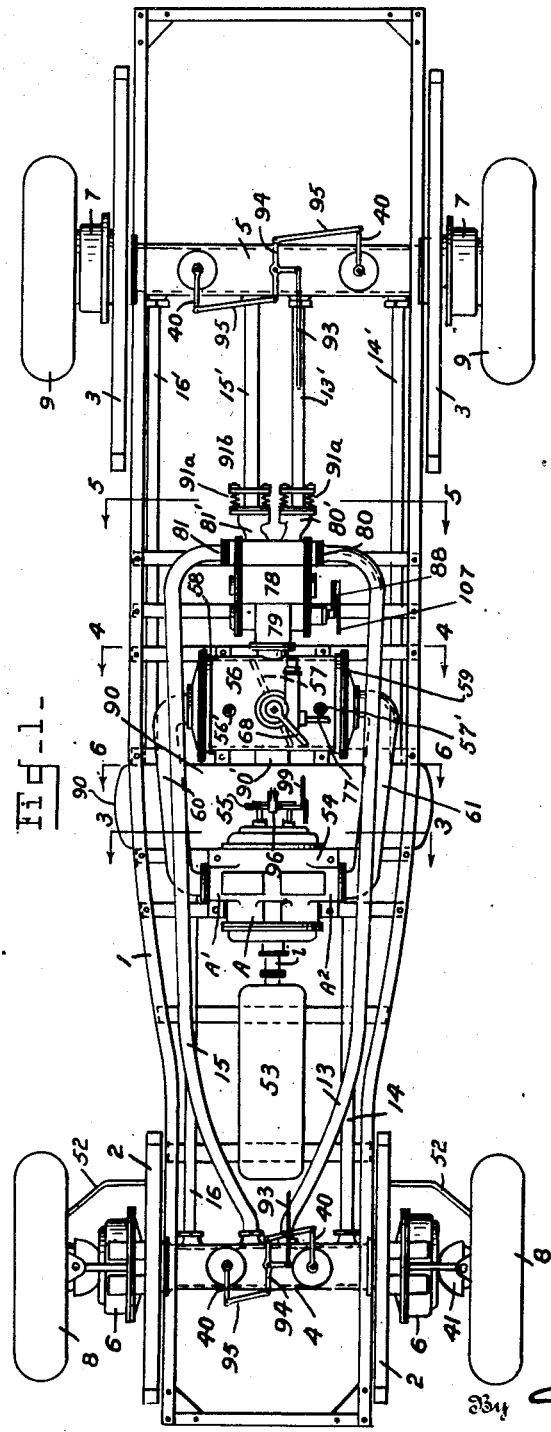

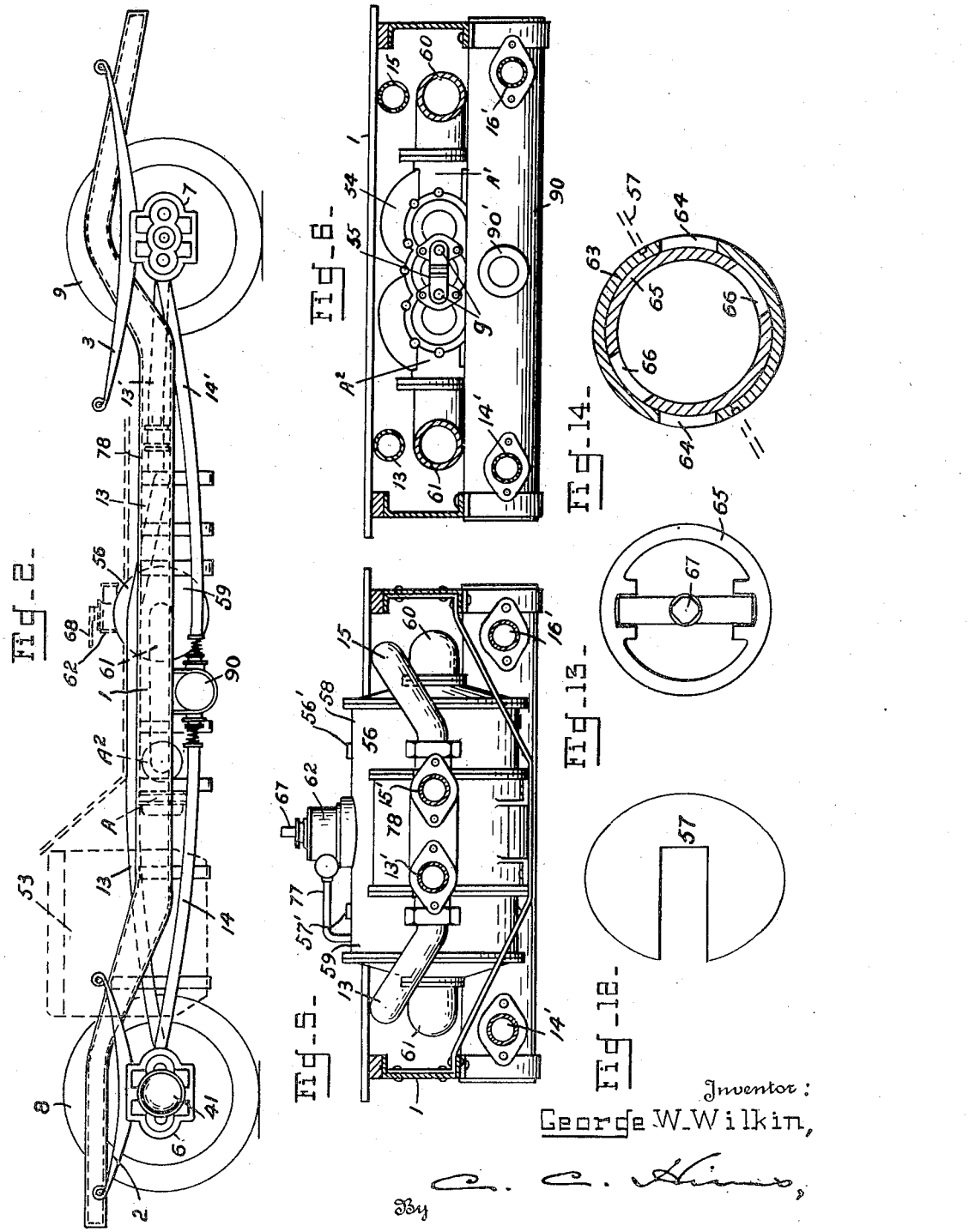

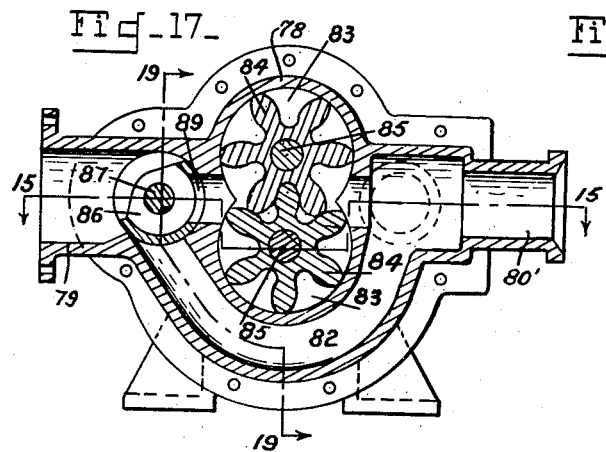
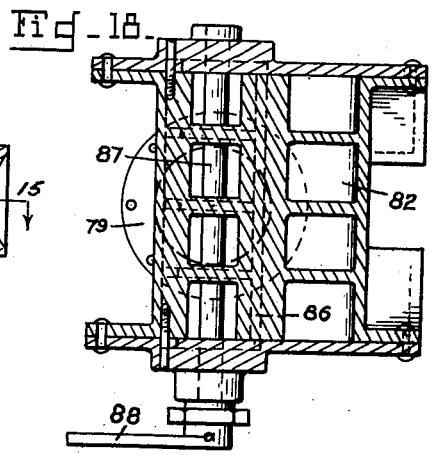
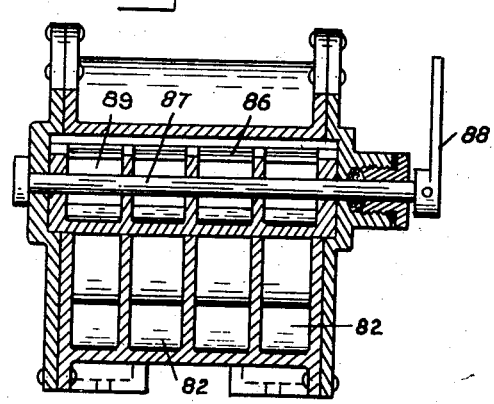
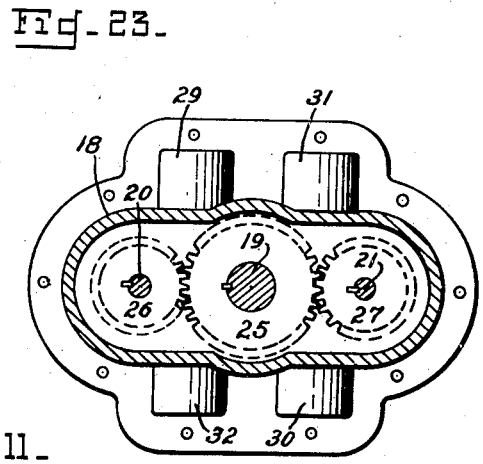
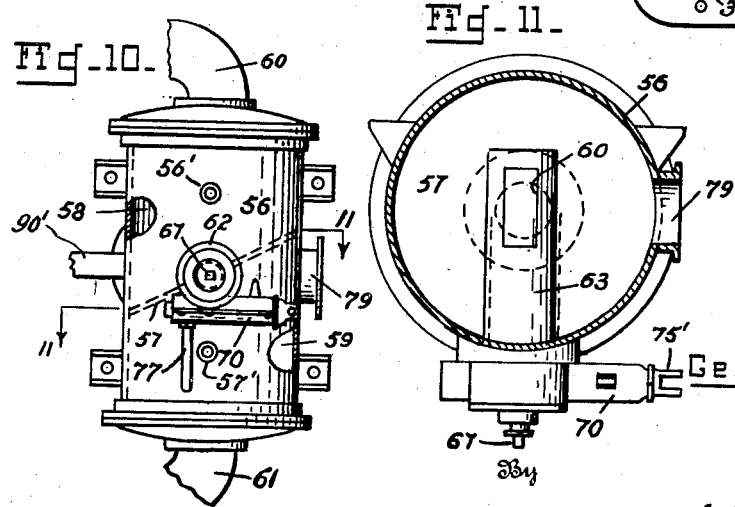
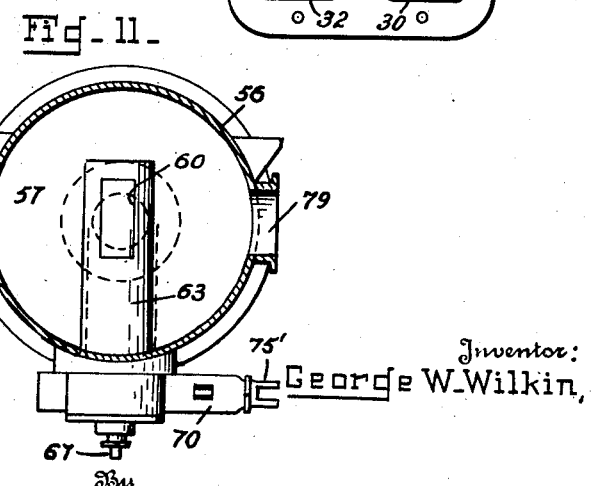

Dec. 2, 1947.  G. W. WILKIN  2,431,719
HYDRAULIC POWER MECHANISM
Filed Oct. 28, 1940  9 Sheets-Sheet 5
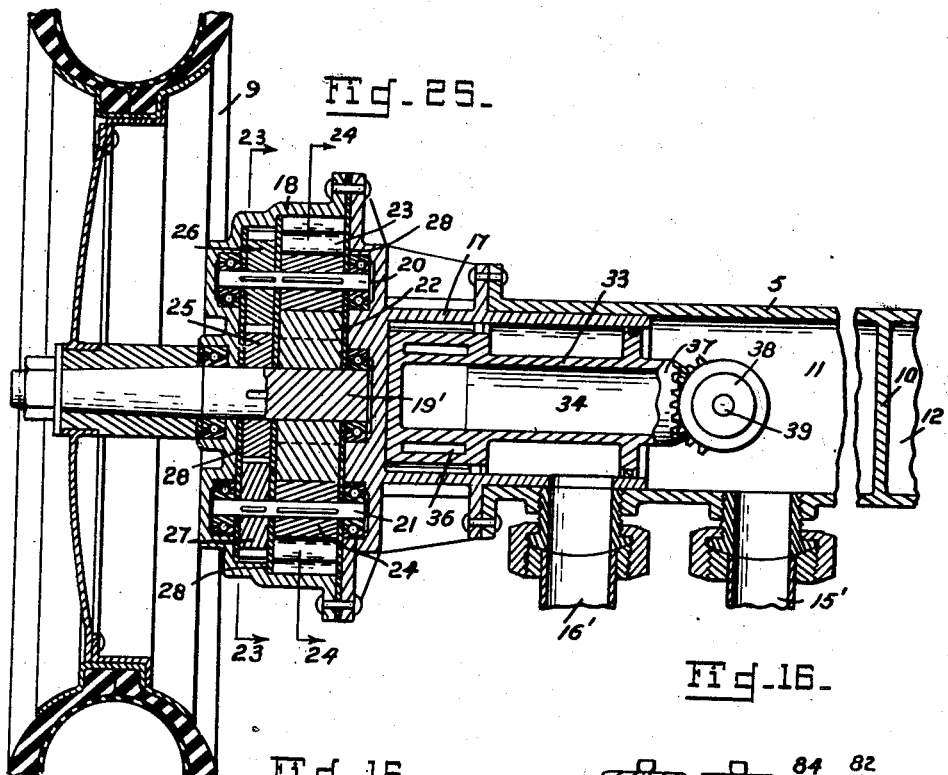
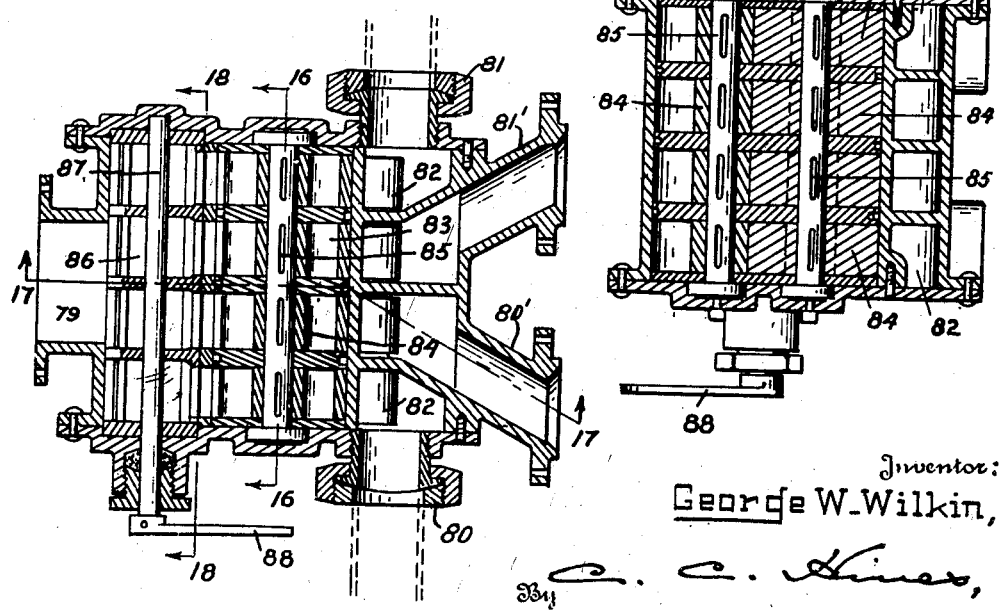
Inventor:
George W. Wilkin, Dec. 2, 1947. G. W. WILKIN 2,431,719
HYDRAULIC POWER MECHANISM
Filed Oct. 28, 1940 9 Sheets-Sheet 6
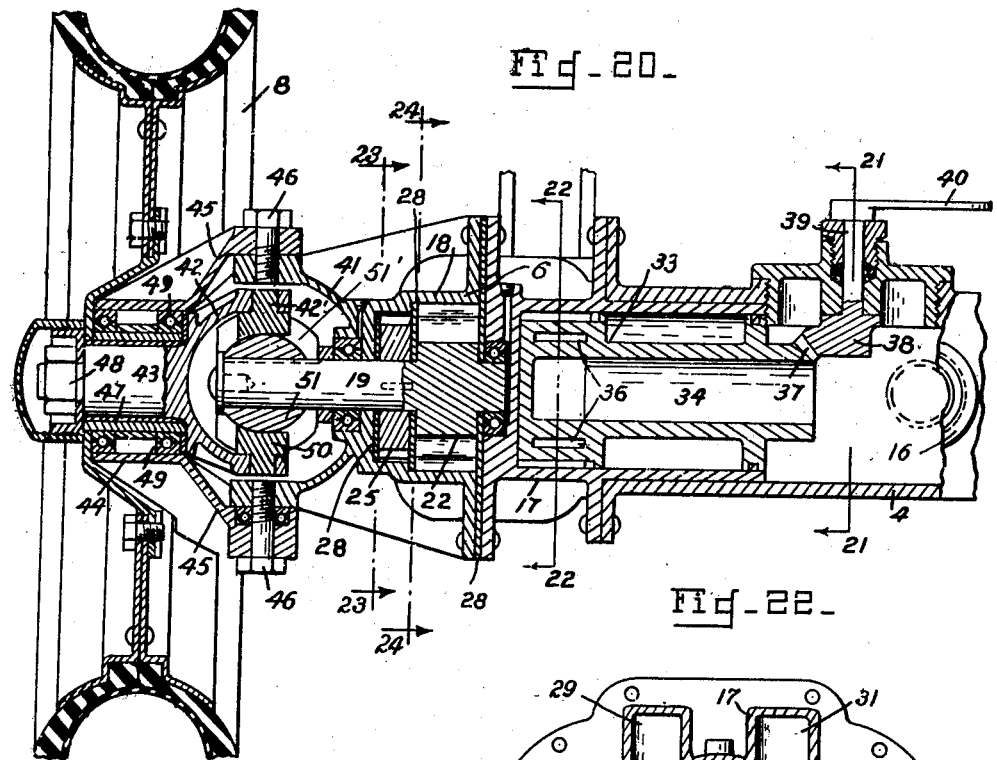
Fig-20-
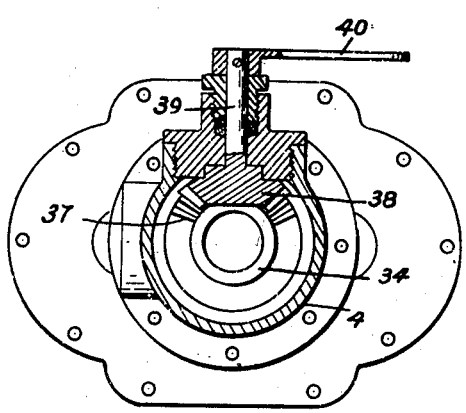
Fig-21-
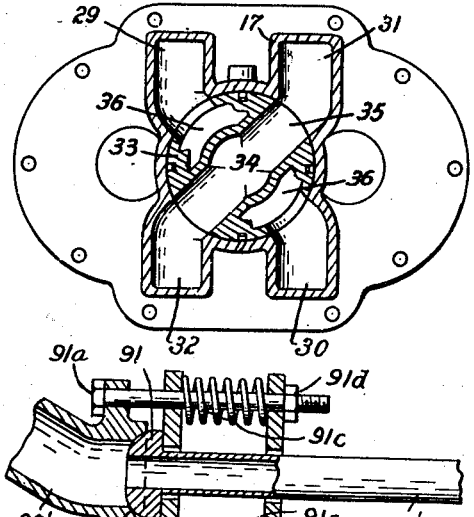
Fig-22-
Fig-26-
Inventor:
George W. Wilkin,
By
Attorney.

Dec. 2, 1947.   G. W. WILKIN   2,431,719
HYDRAULIC POWER MECHANISM
Filed Oct. 28, 1940   9 Sheets-Sheet 7
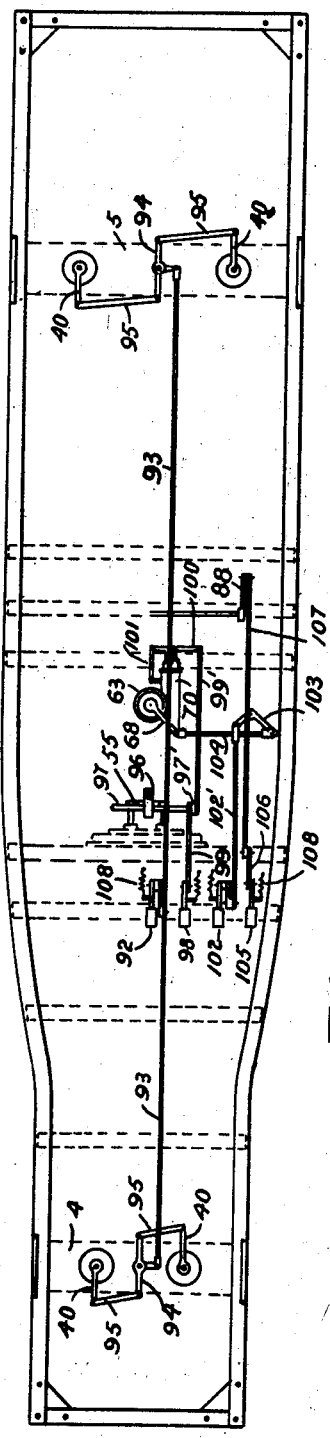
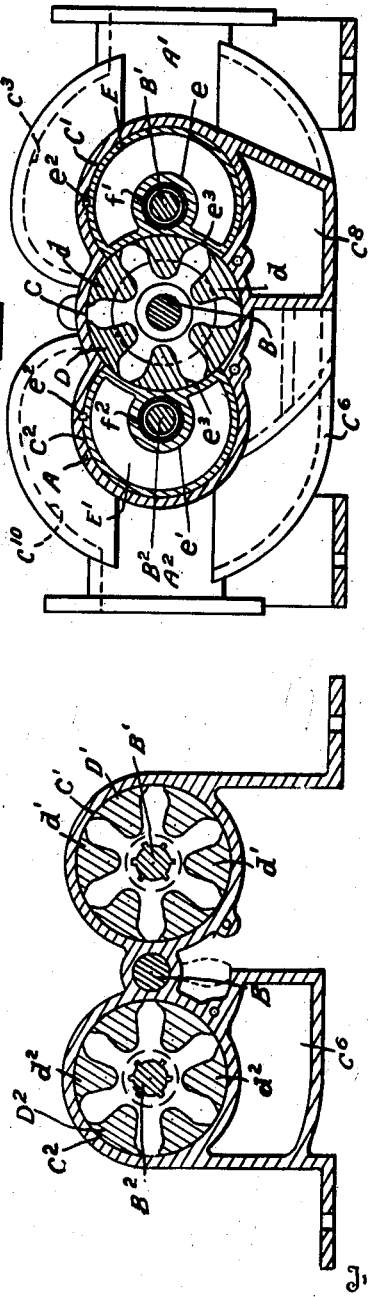
Inventor:
George W. Wilkin,

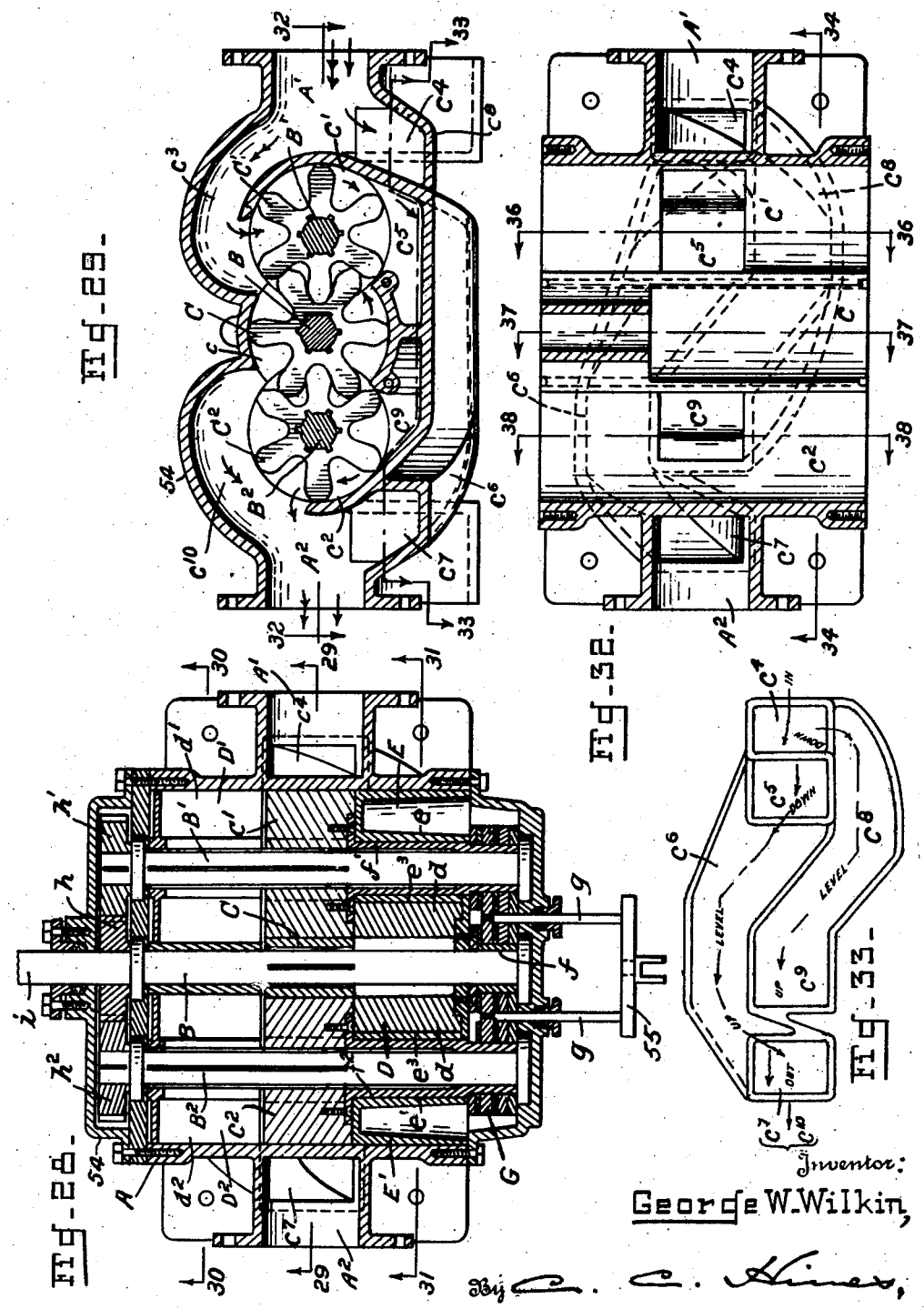

Dec. 2, 1947.  G. W. WILKIN  2,431,719
HYDRAULIC POWER MECHANISM
Filed Oct. 28, 1940  9 Sheets-Sheet 9
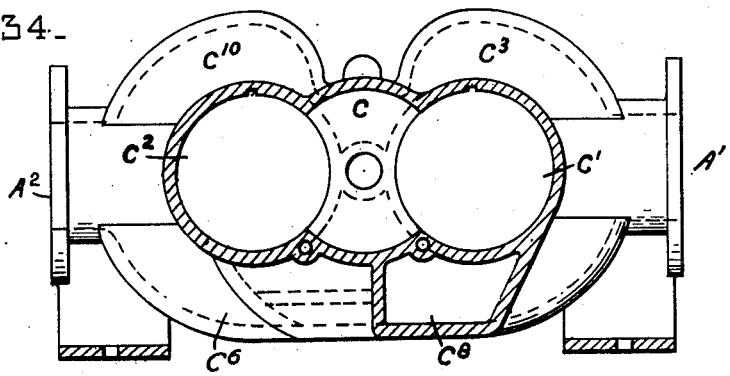
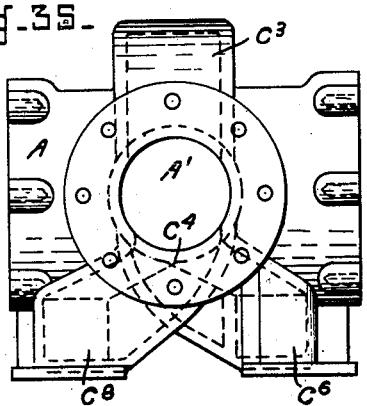
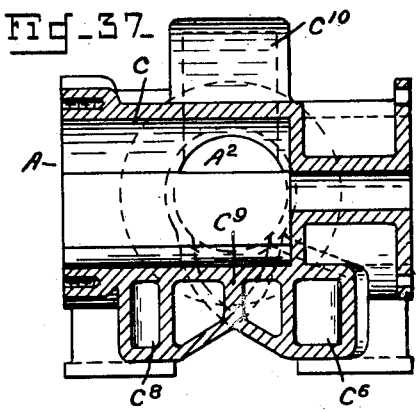
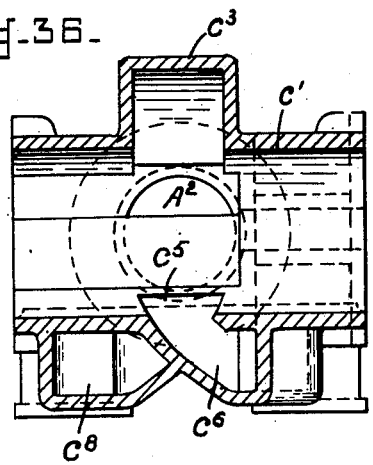
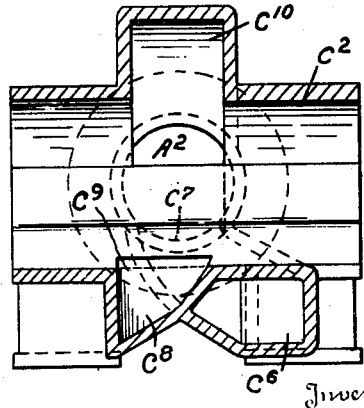
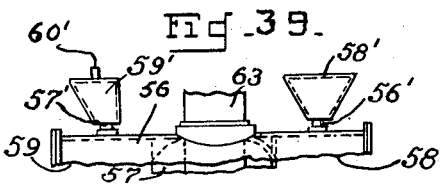
Inventor:
George W. Wilkin,
Attorney.

Patented Dec. 2, 1947

2,431,719

UNITED STATES PATENT OFFICE 2,431,719

HYDRAULIC POWER MECHANISM

George W. Wilkin, Spokane, Wash.; George W. Wilkin, Jr., administrator of said George W. Wilkin, deceased Application October 28, 1940, Serial No. 363,206

21 Claims. (Cl. 60—53)

This invention relates to certain new and useful improvements in hydraulic power mechanisms for driving machinery of various kinds, or for driving automobiles or other power driven vehicles.

One object of the invention is to provide a hydraulic power mechanism which gives great power and flexibility for driving automobiles and various kinds of machinery or machine elements at all speeds within desired speed ranges, and which is readily reversible for driving the automobile or machinery in either of two driving directions at will.

Another object of the invention is to provide a hydraulic power mechanism which embodies novel means for controlling the flow of the power fluid to effect forward or backward movements of the driven element or elements, to compensate for changes in capacity flow and pressure of the fluid so as to obtain any given speed or maintain a uniform flexibility of driving action, to compensate for required variations in speed or working actions of working parts of an automobile or machinery so as to enable differential driving actions to be maintained, and to govern the fluid flow to obtain braking and locking actions whereby to control the speed of the driven part or parts or to lock the same against movement.

Still another object of the invention is to provide novel means for controlling the amount of power fluid supplied to the driven parts and variably regulating the pressure thereof as required at all speeds.

Still another object of the invention is to provide a hydraulic power drive for the wheels of automobiles and other power driven vehicles whereby all or any number of the wheels may be driven to secure any vehicle speed or to control the driving action to maintain driving stability of the vehicle as conditions of the road or other driving conditions may require.

Still another object of the invention is to provide a hydraulic power mechanism for automobiles through which all driving power, differential, reversing and desired braking actions may be carried out in a simple, reliable and effective manner, and which obviates the use of clutches, troublesome gear shifts, differentials and mechanical brakes in common use.

Still another object of the invention is to provide novel means for regulating the fluid supply action of a supply pump, the pressure controlling action of a pressure regulating device, and the action of pressure equalizing and distributing means in such manner as to enable a vehicle to be supplied with the proper power to drive it at any given speed, the flow of fluid to the driven parts controlled according to their working actions at the intended vehicle speed, and the fluid distributed in equal proportions for action upon a plurality of wheel driving motors or elements.

With these and other objects in view, which will appear in the course of the subjoined description, the invention consists of the novel construction, combination and relationship of parts, hereinafter fully described and claimed, reference being had to the accompanying drawings, which disclose an exemplificative embodiment of my invention, and in which:

Fig. 1 is a top plan view, the control mechanism being omitted for clarity of illustration, showing the application of my invention for driving the wheels of an automobile or other self-propelled vehicle.

Fig. 2 is a side elevation of the same.

Figs. 3, 4, 5 and 6 are cross-sections on the lines 3—3, 4—4, 5—5 and 6—6 of Fig. 1.

Fig. 7 is a longitudinal section through the by-pass valve on line 7—7 of Fig. 8.

Fig. 8 is a view in elevation of the by-pass valve.

Fig. 9 is a section on line 9—9 of Fig. 8.

Fig. 10 is a top plan view of the pressure regulating reservoir or differential.

Fig. 11 is a section on the line 11—11 of Fig. 10.

Fig. 12 is a view of the partition plate of the pressure regulating reservoir.

Fig. 13 is a plan view of the main valve casing of the pressure regulating or by-pass valve with cover removed.

Fig. 14 is a section on the line 14—14 of Fig. 8.

Fig. 15 is a horizontal section through the pressure equalizer on line 15—15 of Fig. 17.

Fig. 16 is a section on line 16—16 of Fig. 15.

Fig. 17 is a section on line 17—17 of Fig. 15.

Fig. 18 is a section on line 18—18 of Fig. 15.

Fig. 19 is a section on line 19—19 of Fig. 17.

Fig. 20 is a vertical longitudinal section through one end of the front wheel axle and gear housing or distributor and showing the mounting of one of the front wheels.

Fig. 21 is a section on line 21—21 of Fig. 20.

Fig. 22 is a section on line 22—22 of Fig. 20.

Fig. 23 is a section on line 23—23 of Figs. 20 and 25.

Fig. 24 is a section on line 24—24 of Figs. 20 and 25.

Fig. 25 is a horizontal longitudinal section through one end of the rear wheel axle and gear housing or distributor and showing the mounting of one of the rear wheels.

Fig. 26 is a section showing the joint connection between a return pipe and equalizer or header.

Fig. 27 is a view showing the manually operable controlling means.

Fig. 28 is a top plan view, partly in section, of the pump.

Fig. 29 is a section on line 29—29 of Fig. 28.
Fig. 30 is a section on line 30—30 of Fig. 28.
Fig. 31 is a section on line 31—31 of Fig. 28.
Fig. 32 is a central horizontal section through the pump casing per se taken on line 32—32 of Fig. 29.
Fig. 33 is a diagrammatic plan view on line 33—33 of Fig. 29 through a portion of the casing showing the arrangement of the ports and passages therein.
Fig. 34 is a section on the line 34—34 of Fig. 32.
Fig. 35 is an end elevation of the pump casing.
Figs. 36, 37 and 38 are sections on the lines 36—36, 37—37 and 38—38, respectively, of Fig. 32.
Fig. 39 is a fragmentary view of the pressure regulating reservoir showing the application of the air chambers.

In the practical embodiment of my invention as herein disclosed as a hydraulic power mechanism for automobiles or other like vehicles, 1 designates the chassis frame of the vehicle, which is of suitable design and construction for the purpose. Supported at the front and rear of this chassis frame are sets of springs 2 and 3 supported by front and rear hollow or tubular axle and gear housings 4 and 5. Each of these housings forms a distributing chamber for the supply of motive fluid to and its return from wheel driving motors 6 and 7 which respectively drive the front steering and traction wheels 8 and the rear traction wheels 9. Each housing 4 and 5 is divided by a central partition 10 into chambers or compartments 11 and 12 for the flow of motive fluid to and from the left and right hand wheel driving motors. With the chambers or compartments of the housing 4 communicate sets of fluid supply pipes 13 and 15 and return pipes 14 and 16, respectively, and with the chambers or compartments of the housing 5 communicate sets of fluid supply pipes 13' and 15' and return pipes 14' and 16', respectively.

The front and rear housings 4 and 5, motors 6 and 7 and the means for controlling the supply of motive fluid to and from these motors are generally similar in construction, except that the housing 4 is shorter than the housing 5 and is provided with special means for supporting, transmitting motion to and swinging the front wheels 8 for steering motions. To each end of the housing 4 or 5 is attached a section 17 which forms a valve chamber and also a mounting for suitable attachment of the associated spring 2 thereto, and arranged outwardly beyond this section 17 and attached thereto is the casing 18 of the wheel driving motor 6 or 7 for driving the vehicle wheel located at that end of the housing. The front wheel motor 6 comprises a driving or propeller shaft 19 and a pair of impelling shafts or spindles 20 and 21 located at diametrically opposite sides thereof, on which shafts are keyed sets of impeller gears 22, 23 and 24 and sets of spiral or spur toothed timing gears 25, 26 and 27. These sets of gears are disposed side by side in gear chambers or compartments formed in the casing 18 by suitable partitions 28, the gears 22, 23 and 24 being of gear pump type and acting as impellers actuated by the pressure fluid to transmit motion to the gears 25, 26 and 27 and to the shaft 19, the gears 25, 26 and 27 being employed to synchronize the action of the impeller gears so as to keep their teeth out of contact and from driving engagement and so that they will have full propelling actions under the pressure of the fluid and transmit the power generated by impellers 22, 23 and 24 under pressure of the motive fluid to the shaft in a positive and certain manner and without slippage. By this means wear on the teeth of the gears is also prevented because they are kept out of contact with each other. Communicating with the impeller chamber of the gear casing are sets of ports 29 and 30 and 31 and 32 which connect the same with the valve casing section 17 and which are adapted to serve alternately as supply and return ports whereby either forward or backward motion may be transmitted through the motor to the wheel. In the valve casing section and adjacent portion of the housing 4 or 5 is mounted an oscillatory valve 33 comprising a tubular body portion forming a central supply passage 34 having lateral supply ports 35, said body portion terminating at its outer end in a head portion formed with diametrically opposite return ports 36, the ports 35 and 36 being properly arranged for cooperation with the supply and return pipes 13 and 14, 15 and 16, or 13' and 14' or 15' and 16', as the case may be. The valve body has fixed thereto a gear segment 37 (see Figs. 20 and 21) with which meshes a gear 38 on a shaft 39 journaled in the housing and projecting exteriorly therefrom, to the exteriorly projecting end of which shaft is attached an arm 40 whereby the valve may be actuated to control the supply of motive fluid to and from the motor for driving the same at any desired speed or for reversing the direction of motion thereof. When the valve is adjusted to bring ports 35 into registry with ports 29 and 30 and ports 36 into registry with the ports 31 and 32 the valve is set for a forward drive action. When the valve is adjusted to bring ports 35 into registry with ports 31 and 32 and ports 36 into registry with ports 29 and 30 the valve is set for a reverse or backward driving action.

The construction of each rear wheel driving motor 7 is the same as that of each front wheel motor 6 except that the drive shaft 19' of each rear wheel motor projects outwardly from the motor casing and has directly mounted thereon the associated rear traction wheel 9, while the axle 19 of each front wheel driving motor, which also extends outwardly beyond the motor casing, is modified in construction and arranged to cooperate with other wheel mounting and driving parts whereby the associated front wheel 8 may be driven and also swung transversely of the vehicle for steering motions. As shown, the shaft 19 of each front wheel driving motor projects outwardly into a cup-shaped bearing chamber 41 forming an extension of the motor casing 18 and which receives a cooperating cup-shaped bearing extension 42 on a wheel supporting spindle 43 which extends outwardly through a swinging cylindrical bearing member 44 having fork arms 45 pivotally connected by stud bolts 46 to the bearing cup 41. The wheel 8 has a hub portion 47 which fits about the shaft 43 and extends within the bearing member 44 and is clamped to the axle 43 by suitable fastening means 48. Ball, roller or other suitable anti-friction bearings 49 are disposed between the hub 47 and bearing member 44 so as to provide for free rotation of the wheel and axle 43. The cup member 42 has pivotally connected therewith, as at 42', a bearing socket member 50 receiving and engaging a more or less spherical bearing bolt or head 51 keyed to the outer end of the shaft 19 and feathered or splined, as at 51', to the member 50 so as to couple the shafts 19 and 43 for driving motion from shaft 19 to shaft 43 while permitting the latter-named shaft and the wheel 8 carried thereby to be swung laterally of the vehicle for steering motions. Suitable connections, shown in part at 52 in Fig. 1, may be provided in practice between the front wheel forks 45 to adapt the two front wheels to be swung in unison and these connections may be coupled for operation with the steering mechanism of the vehicle, which may be of ordinary or other suitable type.

Suitably mounted on the frame or vehicle is a prime mover or motor 53, which may be of gasoline or other fuel type. This motor 53 drives a fluid circulating pump 54, which may be a gear type pump. Preferably I employ a variable capacity pump of the general construction disclosed in my Patent No. 2,149,326, dated May 7, 1939, comprising a casing A having intake and outlet ports A', A², in which casing are journaled shafts B, B', B², carrying fluid impelling gears C, C', C². These gears rotate in communicating chambers $c$, $c'$, $c^2$ formed by partitioning the casing as shown. Gear C is keyed to its shaft B to rotate therewith in a fixed plane, while gears C', C² are feathered to their shafts B', B² to rotate therewith and slide thereon forwardly and rearwardly from positions, in which their teeth mesh fully with the teeth of gear C for maximum capacity pumping action, to positions in which their teeth are more or less out of mesh with the teeth of gear C to correspondingly reduce the pumping capacity. Arranged in rear of gear C and fitted to rotate with and slide on shaft B toward and from gear C is a blocking or filling element D having tooth-like filler blocks or ribs $d$ adapted to enter and fill the spaces between the teeth of gear C vacated by the teeth of gears C', C² when the latter are shifted forwardly for capacity reducing actions, so as to block and prevent escape of fluid between the non-engaging portions of the teeth of the gears, whereby the pumping efficiency of the gears at any capacity ratio will be maintained. Hollow shell-like casing fillers E, E' having cylindrical hub portions $e$, $e'$ surrounding the shafts B', B² are disposed to fill the portions of the casing on opposite sides of the element D. These fillers E, E' are feathered or splined to the casing, as at $e^2$, so as to be held against rotation while adapted to slide forward and backward with the element D, the sides of the fillers E, E' adjacent the element D being concaved as at $e^3$ to form seat faces coacting with element D and also having cylindrical portions coacting with the wall of the casing to peripherally enclose the element D against escape of fluid therearound. Arranged between the gears C', C² and the front of the casing in chambers enclosing them are blocking elements D', D² fixed to the shafts B', B² to rotate therewith, and these blocking elements are provided with tooth-like filler blocks or ribs $d'$, $d^2$ to fill the vacant spaces between the teeth of the gears C', C² when the latter are adjusted forwardly beyond the gear C, to prevent leakage of fluid through such spaces for the purpose above described with respect to action of element D. Fixed to element D is a sleeve $f$, rotatable with said element and slidable on the rear portion of shaft B, and fixed to the gears C', C² are sleeves $f'$, $f^2$, rotatable with said gears and slidable on the rear portions of shafts B', B², which sleeves extend at their rear ends through and are rotatable in openings in an adjusting head or plate G coupled to the sleeves to impart forward and backward motions thereto so that the gears C', C² and blocking element D may be simultaneously adjusted, respectively with respect to the blocking elements D', D² and gear C for capacity varying and blocking actions. Rods $g$ connected to the head G extend outward at the rear of the casing and are connected on the outside of the casing to a crosshead 55 coupled to a controlling device whereby the adjustable blocking device and gears are adapted to be adjusted, as hereinafter described. Keyed to the forward ends of the shafts in a gear compartment on the outside of the casing are intermeshing spiral or spur toothed timing gears $h$, $h'$, $h^2$ which serve the same function as the timing gears of the wheel motors whereby a full pumping effect is at all times obtained and whereby the shafts are positively geared to rotate at the same speed and to prevent liability of fluctuations in the pumping action which might otherwise be caused by contact of the teeth of the impeller gears and slippage of the same on each other. The forward end of shaft B projects beyond the casing as at $i$ to permit power to be transmitted thereto from the prime mover 53. By the use of such a pump the force and amount of fluid supplied to the driving motors, as hereinafter described, may be varied within wide limits to obtain any desired speed of the vehicle. Provided for the supply of fluid to the pump and the control of the fluid for working actions is a pressure regulating reservoir 56 which may be of any suitable general form and construction, but which as herein shown comprises a tank divided interiorly by a partition 57 into low and high pressure chambers 58 and 59. A pipe 60 connects the low pressure chamber 58 with the intake A' of the pump 54 and a pipe 61 connects the outlet A² of the pump with the high pressure chamber 59, whereby, in the operation of the pump, fluid from the chamber 58 is drawn into the pump under the action of the pump gears and discharged under the desired working pressure through the pipe 61 into the high pressure chamber 59.

The casing A is provided with a novel arrangement of ports and passages to adapt the three impellers to operate in conjunction with a single intake port A' and also with a single outlet port A². As the fluid is drawn by the action of the gears C, C', C² through intake port A' into the pump casing this fluid is divided into two main portions or streams, one flowing upwardly through port $c^3$ and the other flowing downwardly through port $c^4$. The portion or stream of fluid flowing upwardly in port $c^3$ is divided, in this port, some of it flowing at the top of chamber $c'$ into the interstices between the teeth of gear C in chamber $c$ and being forced by said gear as it rotates counterclockwise through port $c^{10}$ to outlet A², while the remainder flows from the top of chamber $c'$ into the interstices between the teeth of clockwise rotating gear C' and is forced by said gear through port $c^5$, passage $c^6$ and port $c^7$ into outlet port A². The portion or stream of fluid flowing downwardly through port $c^4$, on the other hand, travels through passage $c^8$ and up through port $c^9$ into the bottom of chamber $c^2$, where it is divided, some of it being carried into the interstices between the teeth of the clockwise rotating gear $C^2$ up into port $c^{10}$ and thence into port $A^2$, while the remainder flows from port $c^9$ into the bottom of chamber $c$ and into the interstices between the teeth of gear C by which it is forced into port $c^5$ where it joins the fluid carried down from the upper part of chamber $c'$ as previously described and is forced therewith by gear $C'$ through port $c^5$, passage $c^6$ and port $c^7$ into outlet $A^2$. In these actions the teeth on the lower as well as on the upper portions of the rotating gears have forcing actions on the thus divided portions or streams of fluid. The passages $c^8$, $c^6$ are separated from each other beneath the chambers $c'$, $c^2$ by suitable partition walls (see Fig. 37). By this arrangement of ports the construction of the pump casing is not only simplified, but such construction and arrangement allows a considerable amount of piping, which otherwise would have to be employed, to be dispensed with.

The chambers 58 and 59 serve not only as reservoirs for the direct supply of oil or other pressure fluid to the pump and driving motors, but also serve as pressure relief devices taking care of variations of pressure occurring under different working conditions of the pump and motors and to compensatively regulate the flow of the liquid under different driving conditions of the motors. Each chamber normally is filled about two-thirds full of oil or other fluid, the space above holding air under compression. In order to provide for a flow of the oil between the chambers for balancing and relief actions a combined manually operable and pressure operated pressure relief device 62 is provided. This device comprises a casing 63 fitted in an opening in the partition 57 so as to be exposed in both chambers 58 and 59, said casing having ports 64 therein communicating with said chambers. A hollow oscillating valve 65 is mounted in the casing 63 and provided with ports 66 for cooperation with the ports 64. The valve 65 is coupled to a stem 67 projecting upwardly from the reservoir 56 and to which is connected a crank or operating handle 68 by which it may be manually controlled, as hereinafter described. By rotative adjustment of the valve communication between the chambers 58 and 59 may be freely established for fluid flow actions or cut off to any degree so that any desired pressure differential between the two chambers may be established. The casing 63 has a slot or opening 69 communicating with a casing 70 having a vent port 71 and in which operates a sliding plunger or piston 72. The piston 72 has a stem 73 projecting therefrom and pivotally engaging an aperture in the valve member 65 whereby sliding back and forth movements of the piston 72 will result in back and forth rotational movements of the valve 65 to bring its ports 66 in register to greater or less degrees with the ports 64, and also whereby back and forth rotational movements applied to valve member 65 will result in corresponding back and forth sliding movements of the piston 72. The piston 72 is slidable on a stationary stem 74 and its movement away from port 71 is normally resisted by a coiled compression spring 75 arranged about the stem and whose compression may be regulated to regulate such movement of the valve under different pressures. The means for regulating the compression of the spring and its resistance to the opening movement of the piston 72 comprises a sliding sleeve 72' fitted in the outer end of the casing 70, said sleeve receiving the outer end of the stem 74 and having a flanged inner end bearing on the outer end of the spring 75. A cap 74' closes the outer end of the sleeve and is in threaded engagement therewith whereby the cap and sleeve may be relatively adjusted for bearing engagement with the spring to compress the spring as desired to establish a normal working resistance to the operation of piston 72. The cap has at its outer closed end a clevis or eye 75' for connection with adjusting and operating means whereby the spring may be further compressed and the valve opened for regulating and controlling actions, as hereinafter described. Suitable packing 72" may be placed between the sliding sleeve and cap to prevent fluid leakage.

A pipe 77 connects the vent port 71 with the high pressure chamber 59, so that pressure from this chamber normally acts upon the rear end of the piston 72. The piston 72 has a range of movement in the casing 70 whereby it may be permitted to reciprocate back and forth to operate the valve 65 to close or bring the ports 64 and 66 more or less in communication to normally maintain a predetermined working pressure in the high pressure chamber 59. If, however, the pressure in the chamber 59 should become too high, or above a predetermined limit allowed, due either to the action of the pump or to blocking of the fluid in the flow passages while the pump is operating, the piston 72 will be operated to shift the valve to a full extent to fully open the ports 64 and 66 for flow of fluid between the high and low pressure chambers. When the normal pressure condition in chamber 59 is restored, the pressure of the spring 75 will shift the parts 72 and 65 back to normal working positions.

It will thus be understood that the valve 65 and piston 72 may be normally adjusted or set for pressure relief actions so that when the pressure in the high pressure chamber becomes too high the valve 65 will be automatically operated to restore normal working conditions. Through the adjustments afforded, the valve 65 may be regulated in its action according to the working action of the pump, when operating at low speed or at different high speeds. The operating means 55 of the blocking element D and the piston 72 are preferably connected as hereinafter described so that when the said blocking element is adjusted to regulate the capacity of the pump the valve 65 and piston 72 are coordinately adjusted to regulate the relief action. The valve 65 is also preferably adapted to be manually controlled by direct adjustment thereof to allow free flow of fluid for coasting actions or to retard or stop the flow of the fluid for braking actions, as hereinafter described. By the use of the pressure chambers and the pressure relief device fluctuations of pressure in the fluid lines of the system will be reduced and the flow of the liquid governed so as to prevent unduly high fluctuations and to take care of flow variations caused by different working actions of the wheel driving motors so that the pressure chambers and the pressure relief valve will perform the functions of a mechanical differential, but in a more sensitive manner and much more smoothly at any and all speeds of the vehicle. The construction of these parts allows easy flow of fluid at all pump speeds, and accordingly at all speeds of the vehicle.

The pressure chambers 58 and 59 of the pressure regulating reservoir 56 are provided with outlets 56', 57' in their upper portions for connection with air pressure chambers 58', 59' into which compressed air from the chambers 58 and 59 may flow for elastic compensating actions. These air chambers 58', 59' may be of the general type used in liquid pumping systems or of any other suitable form and construction. The chamber 59' may be provided with a check-valved inlet or fitting 60', which may be similar in character to a pneumatic tire inflating valve, whereby air under pressure may be introduced into the pressure regulating reservoir when desired or required, and whereby air may be released therefrom.

The fluid is normally supplied from the high pressure chamber 59 to the supply pipes 13, 15, 13', 15' leading to the axle housings or distributors 4 and 5 through control valves of a pressure equalizer 78, instead of passing directly from the high pressure chamber to these pipes, in order that the amount of fluid supplied to the supply pipes may be equalized or properly apportioned. This equalizer 78 comprises a casing having an intake connection 79 with the chamber 59 and having outlet connections 80, 81, 80' and 81' connecting with the pipes 13, 15, 13', 15', the port 79 being in communication with each individual port 80, 81, 80', 81' through a by-pass 82. Between the port 79, which may be partitioned into four intake compartments, and the ports 80, 81, 80', 81', are chambers 83 in each of which are a pair of meshing gears 84 mounted on shafts 85 and which are rotated by the flowing liquid and act to arrest pulsations of fluid and to serve as measuring gates whereby an equal amount of fluid is delivered to each motor supply pipe. A rotary control valve 86 is mounted on a shaft 87 journaled in and extending at right angles to the equalizer casing, and said shaft is provided with an operating handle or crank 88 whereby it may be operated to adjust the valve. The valve is a four-way or four-sectioned valve, divided or provided with partitions to form valve portions for respective cooperation with the by-passes and gear chambers, and each valve section comprises a substantially semi-cylindrical part open always to the port 79 and having a port 89 therein for controlling the flow of fluid from the port 79 to its individual by-pass 82 or gear chamber 83. The valve may be adjusted so that all the gear chambers will be in communication with the port 79, so that the fluid delivered from the high pressure chamber 59 will pass through the gear chambers 83 in controlled quantities apportioned or measured by the measuring gate gears for delivery to the supply pipes, or the valve may be adjusted so that ports 89 therein are moved out of registry with the ports leading to the gear chambers and the valve means simultaneously blocking the latter ports from port 79 while connecting port 79 to the by-passes 82 so that the fluid under high pressure from the high pressure chamber may be directly delivered to the supply pipes for passage to the driving motors.

In the ordinary running action of the power mechanism the equalizer is cut out of action by adjustment of valve 86 to close port 89 so that no fluid passes to the impellers 84. When the valve is so adjusted to close port 89 it opens communication between port 79 and the passages 82 to allow free flow of fluid from the pump to each wheel motor. If in the running of the vehicle one wheel should come into contact with slippery ground and spin its motor would rotate faster than its mates while the wheels driven by the latter and traveling in contact with firm ground would lose an amount of traction, due to part of the fluid which should be delivered to their motors being dissipated by the fast running motor. The equalizer may then be utilized to meet this condition and effect an equal distribution of the fluid to all the wheel motors. When, therefore, one wheel strikes a slippery surface and spins with the result of loss of traction by the other wheels, this condition may be corrected by adjusting valve 86 to cut off communication between the port 79 and passages 82 and to open up communication between the port 79 and the chambers 83 to direct the flow of fluid through the impellers 84, whereby each motor is supplied with an equal amount of fluid and prevented from obtaining any more than its share, so that the motor of the previously spinning wheel will be caused to rotate at the same speed as the others. Fig. 17 shows the valve 86 in position to cause the flow of fluid to all the driving wheels in equal amounts. If the vehicle should become stalled by reason of the fact that one of its wheels is spinning on soft or slippery ground, and cannot gain headway because the spinning motor is robbing the others of power, adjustment of the valve 86 from running to equalizing position, will generally cure this difficulty, by restoring full power to the motors of the wheels on solid ground so that they will have sufficient traction to move the vehicle. As the wheel driving shafts are all positively geared to their impeller shafts all wheels, under ordinary or normal running conditions and except in differential actions, will rotate at the same speed, the speed of the wheels when fluid is fed through the equalizing gears being controlled so as to prevent spinning of any wheel when it strikes a slippery surface so that each wheel will always drive with whatever traction it may have. With all wheels on solid ground and fluid being supplied to the wheel motors normally through passages 82 the only differential actions are those which occur when the vehicle is making a turn, when the outer wheels rotate faster than the inner wheels, and which are occasioned by turning the steering wheel.

The spent fluid passing from the motors and distributor housings 4 and 5 into the return pipes is preferably conducted through these pipes to a header or main fluid reservoir 90, in which a store of oil may be maintained, which header or reservoir has a supply connection 90' with the low pressure chamber 58 of the pressure regulating reservoir.

The supply pipes 13', 15' are connected with the outlets 80', 81' of the equalizer chambers and the return pipes 14' and 16' are connected with the header 90 as shown in detail in Fig. 26, by means of flexible joints each comprising a partly spherical head 91 on the pipe pivotally engaging a seat surface 91' about the communicating port in the casing or header and held in engagement therewith by bolts 91a loosely passing through spaced clamping plates 91b loosely mounted on the pipe and one of which bears on the head, coiled springs 91c being disposed on the bolts between the plates and nuts 91d being fitted on the bolts, whereby provision is made for automatically taking up wear between the joint parts while holding said parts in leak-proof engagement, cushioning all shocks and jars falling thereon, and allowing pivotal movements of the supply and return pipes with the wheel supporting housing 4 and springs 3.

The control mechanism for manually operating the various parts which are to be manually controlled may be any suitable construction. In the present instance, there is shown (see Figs. 1 and 27) means for adjusting the distributor valves in the housings 4 and 5, said means comprising a pedal 92 having a crank connection with a rod 93 coupled at its ends to T-shaped crank levers 94 which are coupled by links 95 to the actuating arms 40 of the distributor valves whereby said valves may be adjusted for fluid regulating, braking and motor reversing actions. Means are provided for adjusting the element 55 of the adjustable gears and blocking elements of the pump and simultaneously regulating the tension of the spring 75 of the piston 72. This means comprises a crank arm 96 fixed to a rock shaft 97 and which is pivoted to the element 55 and adapted to be operated by a pedal 98 coupled by a connecting rod 99 to a crank arm 97' on shaft 97, which crank arm is coupled by a connecting rod or link 99' to a lever 100. This lever 100 is coupled by a link 101 to the casing 70 and pivoted to the stem or eye 75' of the cap 74' of the piston 72 whereby the tension of spring 75 may be increased when required to establish a high resistance to the high pressure operation of the piston 72. A pedal 102 is provided for directly actuating the valve 65 for pressure relief actions. This pedal is coupled by a link 102' to a bell crank lever 103 which is coupled by a link 104 to the arm 68 of valve 65 whereby said valve may be manually adjusted to a fully open position when desired. A pedal 105 coupled by a link 106 and connecting rod 107 to the crank arm 88 is also provided for transmitting motion to the equalizer valve 86, whereby said valve may be adjusted to cause the flow of fluid to the working motors either through the passages 82 or equalizing chambers 83 at any time. Where the mechanism is used for driving an automobile the operating parts above described may be arranged to be conveniently operated from the driver's seat of the vehicle. To retain the parts 92, 96, 98, 102 and 105 in their normal or neutral positions, a retracting spring 108 may be suitably connected with each of said parts for that purpose.

The function of the high pressure chamber 59, containing a body of motive fluid and a superposed cushioning body of compressed air, is to provide a reservoir in which the fluid delivered by the pump for supply to the motors may be stored at a desired working pressure. This chamber with its confined body of air takes care of any fluctuations due to any irregularities of action of the pump at any working capacity and insures the supply to the pipes 13, 15, 13', 15' and the wheel motors, when the by-pass valve 86 connects the port 79 with the by-passes 82, of working fluid which is of more even and regular flow and more uniform working pressure than if directly delivered by the pump. When the valve 86 is open, as above stated, for the direct supply of fluid to the supply pipes 13, 15, 13', 15' the chamber 59 also permits of automatic adjustments of the fluid and variable rates of flow of the same in said pipes to compensate, in the high pressure side, for differential motions of the wheels, as when the vehicle is making a turn, so that each wheel may turn at its proper speed while still receiving a full working impulse from the working fluid. In other words, the elastic backing of the fluid by the air in the chamber 59 allows the flow of fluid in the supply pipes leading to the short turning wheels to be retarded and the flow of fluid in the supply pipes leading to the long turning wheels to be accelerated while maintaining a regular flow of the fluid to the wheel motors.

The function of the low pressure chamber 58 is to provide, in connection with the tank 90, a reservoir for the supply of fluid to the pump and to receive the return fluid from the motors. It also serves as a pressure relief chamber for the chamber 59 whereby, through the action of valve 65 and piston 72, a desired working pressure may be maintained in the chamber 59 and any excess pressure vented therefrom into chamber 58. As this chamber 58 also contains a body of working fluid backed by a superposed body of air, which may be normally at a pressure somewhat above normal atmospheric pressure, a low pressure is maintained in the return pipes just sufficient to keep the pressures in said pipes normally balanced without imposing back pressures on the motors, while allowing the fluid to travel at required flow ratios in the pipes when the motors operate at different speeds, as in differential actions.

In the normal condition of the system with the prime mover 53 at rest, the pump blocked and the valves 33 closed the fluid will be blocked against flow, so that the wheel motors are fully braked against movement. If the prime mover 53 is started in action with the pump blocked no circulation of fluid will take place, as the pump gears will turn idly. If, however, under such conditions pressure in the chamber 59 should be at or near the determined working pressure and the blocking elements of the pump should be partly retracted, with the valves 33 closed, so that a circulation of fluid will be caused, the fluid will be pumped into chamber 59 until the pressure rises sufficiently therein to act on plunger 72 and cause the same to open the valve 65 sufficiently to allow passage of fluid into chamber 58 and thence back to the pump, so that a closed circuit will be formed to allow flow of fluid without damage to the pump or other parts of the apparatus. In this operation, as well as at all other times in the operation of the apparatus, the pressure of the fluid in the chamber 59 and the pressure at which the plunger 72 is operated to open the valve 65, may be regulated as desired by varying the resistance of the spring 75, and in the operation of the pump the resistance of this spring will be varied as the pump blocking elements are adjusted to vary the effective capacity of the pump in order that a predetermined pressure in the chamber 59 may be maintained proportionate to the pumping rate, speed of the vehicle and volume and force of the fluid to be supplied to the wheel motors to drive the vehicle at any desired speed.

In operating a motor vehicle equipped with this drive mechanism, the prime mover 53 is started in the usual way with the pump gears shrouded or blocked by the blocking elements, so that the pump gears will rotate without pumping fluid. Pedal 92 is then manipulated to adjust the valves 33 for forward or reverse movements, after which pedal 98 is operated to shift the blocking elements outwardly to a greater or less extent to cause the pump gears to pump more or less liquid. In the normal running of the vehicle the equalizer valve 86 is kept open to passages 82, but in starting the vehicle, and if there is any difficulty in starting on bad ground or on a grade, this valve may be adjusted to close communication between ports 79 and passages 82 and to open communication between ports 79 and the impeller chambers 83, as shown in Figure 17, to cause the fluid to pass through the impeller chambers 83, so that an equal amount of fluid may be supplied to all the wheel motors for securing uniform traction of all the wheels. At the same time, if desired, valve 65 and piston or plunger 72 may be adjusted or the spring 75 compressed to maintain a high pressure in the chamber 59 to supply the fluid under maximum working pressure to the wheel motors. When after a reversing action the valves 33 are set for a forward drive, the valve 86 is adjusted to close communication between the port 79 and impeller chambers 83 and open communication between the port 79 and passages 82 for free flow of fluid to all the wheel motors, the pumping action, and consequently the speed of the vehicle, being controlled by shifting the blocking elements of the pump inwardly or outwardly to vary the effective capacity of the pump. With the flow of fluid through passages 82 differential actions of the wheel motors are allowed, as previously described, because of the variable flow movements in the supply and return pipes allowed by the high and low pressure chambers.

Partial or complete braking may be effected by shifting the blocking elements partly or completely inward to reduce or stop the pumping action of the pump. When the pump gears are completely blocked or shrouded and valves 33 closed, the flow of the fluid will be completely arrested and the movements of the wheels stopped. The running speed of the vehicle may also be reduced by adjusting the blocking elements to reduce the working capacity of the pump and by simultaneously partially closing valves 33 to reduce the amount of fluid supplied to the motors, or the speed of the vehicle may be checked, without reducing the effective capacity of the pump, by partially closing valves 33 or adjusting valve 86 to a position in which it blocks the flow of fluid through passages 82 and partially blocks or reduces the flow of fluid to chambers 83, or by so adjusting all of these valves. When valves 33, valve 86, or all of these valves are thus adjusted to check the speed of the vehicle without reducing the effective capacity of the pump, and a reduction in the flow of fluid to the wheel motors occurs without reducing the amount of fluid supplied by the pump, the excess fluid so supplied by the pump to the chamber 59 will cause a rise of pressure in said chamber. This rise of pressure, if above the intended normal maximum working pressure in the chambers 59, will cause valve 65 to be opened by piston 72 to allow flow of liquid from chamber 59 into chamber 58 for a pressure relief action.

As hereinbefore stated, the high pressure chamber 59 is normally two-thirds filled with liquid, the level of the liquid being above the ports 64 and 66 in the by pass device 62, so that when the excessive pressure is reached and the valve 65 is operated by piston 72, liquid alone will be discharged from chamber 59 into chamber 58 and hence the air will be retained in chamber 59. In the case of excessive pressure, if the pressure rises to a slight degree above the intended normal maximum working pressure, valve 65 will be moved to a slightly open position by a slight movement of the piston 72 to the right in Fig. 9 to discharge sufficient amount of liquid from 59 into 58 to reduce the pressure in 59 to a point just below normal maximum working pressure, whereupon the valve 65 will be at once closed by the action of spring 75. If at any time the pressure in 59 should be increased to still higher degrees above the maximum working pressure, the piston 72 will be moved to greater degrees to the right in Fig. 9 to cause the valve 65 to be opened to greater degrees for the discharge of liquid from 59 to 58 to relieve 59 from the excessive pressure. In all of such cases, however, no air will discharge from 59 through the open valve ports 64 and 66, for the reason that as soon as the pressure is reduced to the set maximum working pressure, spring 75 will immediately close valve 65. The ports 64 and 66 are so dimensioned as to secure such working actions in any of the positions to which valve 65 is moved under different pressures in order to prevent too rapid discharge of the liquid from 59 and loss of air therefrom ordinarily in relieving excessively generated pressure. The pressure at which the valve 65 is operated, however, may be permanently regulated or temporarily controlled by varying the resistance of the spring 75, by the means described, to the valve-opening movement of the piston 72. The actions of the valve 65 above described are its normal actions which occur in relieving excessively generated pressure within certain limits. A condition may arise, however, in which the pressure in 59 reaches an abnormally high degree, due, for example, to an accidental stoppage of liquid flow in the flow lines while the pump and motor are operating at high speed. In such event the piston 72 will be moved all the way to the right in Fig. 9 to fully open ports 64 and 66 for the rapid discharge of liquid therethrough, but as soon as the pressure in 59 is reduced by such bent actions spring 75 will operate to return valve 65 to closed position and piston 72 to its normal position shown in Fig. 9. If in such an action of piston 72 and valve 65 there should be a loss of air from 59, air may be supplied to 59 through valve 60' (Fig. 39) to take the place of the air so lost, and if at different times more or less air is desired in 59 to modify the action thereof the same may be supplied or released through the said valve 60'.

In the normal running of the vehicle with the fluid traveling through passages 82, any slight variations in speed between the wheels which may temporarily occur will be readily permitted, as accelerating and decelerating movements of the fluid will be allowed by chambers 58 and 59. An important advantage obtained with my improved driving mechanism, in addition to those stated, is that if one of the wheels of the vehicle should be broken, the vehicle may still be driven by substituting a skid for the broken wheel and adjusting valve 86 to throw the equalizer gears into action. With these gears in action fluid will be supplied to all wheels and the motor of the broken wheel will operate in perfect unison with the others, while the vehicle is being propelled by the other three wheels.

It will be understood that while I have shown in the present instance a four-wheel drive for automobiles or like vehicles, the power mechanism may, by omission of parts or slight changes in construction, be used as a two-wheel drive, for driving either the front wheels or the rear wheels of the vehicle. Similarly, the mechanism when used for general purposes in driving machinery, may be employed for operating any number of motors. In practice, the adjustable gears and blocking means of the pump, the distributor valves and the by-pass valves may be controlled by control devices constructed and arranged so as to be conveniently operated by the automobilist. As stated, in practice the pump gear adjusting and blocking means and the by-pass valve may be coupled so that they may be simultaneously adjusted for a coordinate pump capacity control and pressure equalizing or differential action control regulated properly with respect to the volume of fluid circulation for the pump capacity. The operating means for controlling the distributor valves may be adapted to operate all four distributor valves alike simultaneously, to operate them separately or individually, or to operate them independently as front or rear pairs, as may be desired or found most desirable for different service purposes.

Also it will be understood that while the invention is shown as employed for driving an automobile or like vehicle, it will be understood that it may be employed for operating various kinds of machinery, and may be employed with high efficiency for the purpose of driving a plurality of motors from a common prime mover in a most efficient manner.

From the foregoing description, taken in connection with the accompanying drawings, the construction and mode of operation of my improved hydraulic power transmitting mechanism will be understood without a further and extended description and it will be seen that the invention provides a power mechanism of this type by means of which motion at any speed within wide limits and in either direction may be transmitted to a driven element or machine in such a manner that a flexible driving action is obtained so that speed changes may be smoothly effected, thus doing away with the use of troublesome and complex speed changing and reversing devices for the purposes. Also it will be seen that the invention provides a simple, durable and efficient type of power mechanism which delivers a maximum amount of power at any speed, without losses commonly due to leakage past the working parts of the pump and motor. Furthermore, it will be seen that the invention provides a simple, reliable and efficient means for furnishing at all times an adequate supply of the working fluid, and to maintain smoothness of operation of the mechanism at any working speed. Through the control afforded by the working parts of the device the speed of operation and amount of power applied to the wheels may be varied as desired in a thoroughly efficient manner from minimum to maximum without the use of change speed gearing of any kind for shift to different speeds and without the use of a differential mechanism connecting either pair of driving wheels, since the pressure tanks and by-pass connection therebetween provides the equivalent of a differential in permitting rotation of the wheels of either pair at different speeds to compensate for variable speed actions when the vehicle is making turns. By means of the control devices employed the flow of the motive fluid may be governed to effect braking actions as well as to lock the vehicle wheels against movement at any time, so that the use of ordinary brakes may be dispensed with if desired. By the provision of means for adjusting the control valves of the wheel motors from a position convenient to the driver's seat, the driving or braking actions of the motors may be independently or conjointly controlled to meet different exigencies or contingencies of service in travel and to maintain the stability and traction of the vehicle at all times and under all road and other traveling conditions. Through the controls provided the power mechanism may also be reversed with facility and braked to any degree or locked from motion, thus making the apparatus valuable for use where speed control and locking of the parts from movement is desirable at different times in the working of the apparatus or stoppage of the same from movement. Other advantages of the invention will be evident to those versed in the art from the foregoing description.

While the structure disclosed is preferred, it will, of course, be understood that changes in the form, proportions and details of construction and arrangement of the parts may be made within the scope of the appended claims, without departing from the spirit or sacrificing any of the advantages of the invention.

What I claim is:

1. In a hydraulic power mechanism employing a pump, a plurality of motors, and sets of fluid supply and return connections between the pump and the respective motors, high and low pressure chambers arranged, respectively, in the fluid supply and return connections between the pump and motors and each containing a body of working fluid and a superposed body of compressed air, adjustable means for varying the effective capacity of the pump, valve mechanism automatically operating at a predetermined pressure in the high pressure chamber to establish communication between said chambers, and means operating in connection with the first-named means for governing the valve mechanism to vary its working action in accordance with the working capacity of the pump.

2. In a hydraulic pressure apparatus employing a pump and a plurality of motors, high and low pressure chambers each containing a body of motive fluid and a superposed body of air under pressure, fluid supply and return connections between the outlet and inlet of the pump and the high and low pressure chambers, respectively, fluid supply and return connections between the high and low pressure chambers and the motors, a rotary valve controlling communication between said chambers, and a reciprocatory valve operating device automatically controlled by the pressure in the high pressure chamber for operating said valve.

3. In a hydraulic power apparatus employing a pump, a plurality of hydraulic motors, and supply and return connections between the pump and motors, high and low pressure chambers arranged, respectively, in said supply and return connections and each containing a body of motive fluid and a superposed body of air under pressure, a valve automatically controlled by variations of pressure in the high pressure chamber for opening or closing communication between the chambers, said valve being subjected to and adapted to open to varying degrees under different pressures in the high pressure chamber, manually operable means for establishing different resistances to the opening of the valve, and manually operable means for controlling the opening and closing movements of the valve.

4. In a hydraulic power apparatus employing a pump, a plurality of hydraulic motors, and fluid supply and return connections between the pump and motors, high and low pressure chambers arranged, respectively, in said fluid supply and return connections between the pump and motor and each containing a body of motive fluid and a superposed body of air under pressure, a pressure controlled valve means subjected to the pressure in the high pressure chamber and operating at a predetermined pressure in said chamber to permit flow of fluid between the chambers, and means for rendering said valve means inactive for an automatic flow control action and arbitrarily governing its action so that a desired high pressure may be maintained in the high pressure chamber.

5. In a hydraulic power mechanism employing a pump, a plurality of hydraulic motors, and fluid supply and return connections between the pump and motors, high and low pressure chambers arranged, respectively, in said fluid supply and return connections between the pump and motors and each containing a body of motive fluid and a superposed body of air under pressure, a pressure operated valve means subjected to the pressure in the high pressure chamber and normally automatically controlling communication between said chambers, and a manually operable means for holding said valve means closed and inoperative for controlling communication between the chambers.

6. In a hydraulic power mechanism employing a pump, a plurality of motors, and supply and return connections between the pump and motors, high and low pressure chambers arranged, respectively, in said supply and return connections between the pump and motors and each containing a body of motive fluid and a superposed body of air under pressure, a valve controlling communication between the chambers, a pressure-operated device subjected to the pressure in the high pressure chamber for normally automatically operating the valve, and manually operable means for independently operating said valve.

7. In a hydraulic power mechanism employing a pump, a plurality of hydraulic motors, and supply and return connections between the pump and motors, high and low pressure chambers arranged in said connections between the pump and motors and each containing a body of motive fluid and a superposed body of air under pressure, said high pressure chamber communicating with the pump, and the supply connections and said low pressure chamber communicating with the pump and the return connections, a valve controlling communication between said chambers, a pressure controlled device exposed to and governed by the pressure in the high pressure chamber for operating said valve, and manually operable means to vary the resistance of opening movement of the valve or for holding the valve closed.

8. In a hydraulic power mechanism employing a pump, a plurality of hydraulic motors, and supply and return connections between the pump and motors, high and low pressure chambers arranged, respectively, in said supply and return connections between the pump and motors and each containing a body of motive fluid and a superposed body of air under pressure, a valve controlling communication between said chambers, a pressure operated device exposed to and movable under pressure of the fluid in the high pressure chamber to open the valve, spring means for moving said device in its valve closing direction and opposing its movement in valve opening direction, and manually operable means for augmenting the resistance of the spring means to movement of the device in its valve opening direction.

9. In a hydraulic power mechanism employing a variable capacity pump, a plurality of hydraulic motors, and supply and return connections between the pump and motors, high and low pressure chambers disposed, respectively, in said supply and return connections and each containing a body of motive fluid and a superposed body of air under pressure, a valve controlling communication between said chambers, a pressure operated device normally tending to hold the valve closed and exposed to and governed by the pressure in the high pressure chamber and adapted to be operated at a predetermined pressure in said chamber to open the valve, and manually operable means for regulating the action of the pump to vary its effective capacity and simultaneously varying the resistance to opening movement of the valve.

10. In a hydraulic power apparatus employing a pump, a plurality of motors, and fluid supply and return connections between the pump and motors, and a unitary flow control means in the supply connections between the pump and motors comprising a casing having a set of passages with apportioning devices for controlling the flow of fluid in like amounts to the motors and having a set of passages for by-passing the fluid about and permitting flow of the fluid to the motors without action thereon by the apportioning devices, and a valve in said casing for directing the flow of fluid through either set of passages.

11. In a hydraulic power apparatus employing a pump, a plurality of hydraulic motors, and supply and return connections between the pump and motors, high and low pressure chambers arranged, respectively, in said supply and return connections between the pump and motors and each containing a body of working fluid and a superimposed body of air under pressure, and means arranged in the supply connections between the high pressure chamber and motors for uniformly apportioning the supply of high pressure fluid to the different motors, and means for by-passing the fluid about the apportioning means and delivering the same through the supply connections to the motors.

12. In a hydraulic power mechanism employing a variable capacity gear pump, adjustable means for varying the working capacity of the pump, a plurality of motors driven by motive fluid circulated by the pump, and fluid supply and return connections leading from and to the pump and to and from the motors, high and low pressure chambers each containing a body of motive fluid and a superimposed body of air under pressure and communicating, respectively, with said fluid supply and return connections, means subjected to the pressure of and operated at a predetermined pressure in the high pressure chamber for permitting flow of fluid between said chambers, means arranged in the supply connections between the high pressure chamber and motors for uniformly apportioning the supply of high pressure fluid to the different motors, and means for by-passing the fluid about the apportioning means and delivering the same through the supply connections to the motors.

13. In a hydraulic power mechanism employing a variable capacity gear pump, adjustable means for varying the working capacity of the pump, a plurality of motors driven by motive fluid circulated by the pump, and fluid supply and return connections between the pump and motors, high and low pressure chambers each containing a body of motive fluid and a superposed body of air and communicating respectively with said fluid supply and return connections, a pressure regulating valve constantly exposed to and governed by the pressure in the high pressure chamber and automatically controlling communication between said chambers, and means for adjusting said valve simultaneously with the adjusting means for varying the capacity of the pump.

14. In a hydraulic power mechanism employing a variable capacity gear pump, adjustable means for varying the working capacity of the pump, a plurality of motors driven by motive fluid circulated by the pump, and fluid supply and return connections leading from and to the pump and to and from the motors, high and low pressure chambers each containing a body of motive fluid and a superposed body of air and communicating respectively with said fluid supply and return connections between the pump and motors, a valve for controlling communication between said chambers, a pressure operated device controlled by pressure in the high pressure chamber for opening the valve to different degrees at predetermined different pressures in said chamber, and means for adjusting said means for varying the working capacity of the pump and simultaneously controlling the action of the valve operating device.

15. In a hydraulic power apparatus employing a pump, a plurality of motors, and fluid supply and return connections between the pump and motors, valves in said connections for controlling the flow of fluid to the motors for forward or backward driving actions of the motors, an equalizer in the supply connections comprising a casing having a set of passages with apportioning devices for supplying equal amounts of fluid to the supply connections for feed to the motors and having a set of passages for by-passing the fluid about and permitting flow of the fluid to the motors without action thereon by the apportioning devices, a valve in the casing directing the flow of fluid through either set of passages, and remote control means for operating said valve.

16. In a hydraulic power mechanism employing a pump, a plurality of hydraulic motors, supply and return connections between the pump and motors, high and low pressure chambers arranged, respectively, in the supply and return connections and each containing a body of motive fluid and a superposed body of air under pressure, valves controlling the supply of fluid to and its discharge from the motors for forward and backward driving actions, a pressure controlled valve governed by the pressure in the high pressure chamber for automatically controlling communication between said pressure chambers, equalizing means in the supply connections between the high pressure chamber and the motors for apportioning equal amounts of fluid to the respective motors, and means for supplying the fluid to the motors from the high pressure chamber without passing through the apportioning means.

17. In a hydraulic power mechanism employing a variable capacity pump, a plurality of motors, fluid supply and return connections between the pump and motors, valves for, respectively, controlling the supply and exhaust of fluid pressure to and from the respective motors through said connections for driving the motors forwardly or backwardly, means for simultaneously and coordinately operating said valves, high and low pressure chambers arranged, respectively, in said supply and return connections and each containing a body of motive fluid and a superposed body of air under pressure, a valve normally controlling communication between said chambers, pressure operated means exposed to the pressure in the high pressure chamber and operated thereby for controlling said valve, equalizing means in the supply connections between the high pressure chamber and the motors for apportioning equal amounts of fluid to the respective motors, and means for supplying the fluid to the motors from the high pressure chamber without passing through the apportioning means.

18. In a power transmitting system employing a pump for supplying a motive fluid under pressure to a plurality of motors to be driven, a high pressure chamber in communication with the pump outlet, a low pressure chamber in communication with the pump inlet, each of said chambers containing a body of motive fluid and a superposed body of air under pressure, supply conductors for conducting motive fluid from the high pressure chamber to the respective motors, return conductors for returning spent motive fluid from the respective motors to the low pressure chamber, a valve device controlled by variations of pressure in the high pressure chamber and automatically operable for effecting a flow of fluid from the high pressure chamber to the low pressure chamber when a predetermined high pressure in said high pressure chamber is reached, and manually operable means for resisting the operation of the valve device and varying the resistance to thereby vary the pressure at which the valve device is operated.

19. In a power transmitting system employing a pump for supplying a motive fluid under pressure to a plurality of motors to be driven, a high pressure chamber in communication with the pump outlet, a low pressure chamber in communication with the pump inlet, each of said chambers containing a body of motive fluid and a superposed body of air under pressure, supply conductors for conducting motive fluid from the high pressure chamber to the respective motors, return conductors for returning spent motive fluid from the respective motors to the low pressure chamber, means for varying the effective capacity of the pump, a valve controlling communication between the chambers, a pressure operated device for opening the valve under a predetermined pressure in said high pressure chamber to permit of the flow of fluid between said chambers, and means operable in conjunction with said pump capacity varying means resisting the operation of the valve and varying the resistance to thereby vary the pressure at which the valve is operated.

20. In a power transmitting system employing a pump for supplying a motive fluid under pressure to a plurality of motors to be driven, a high pressure chamber in communication with the pump outlet, a low pressure chamber in communication with the pump inlet, each of said chambers containing a body of motive fluid and a superposed body of air under pressure, supply conductors for conducting motive fluid from the high pressure chamber to the respective motors, return conductors for returning spent motive fluid from the motors to the low pressure chamber, means in communication with and normally operated at a predetermined pressure in the high pressure chamber for automatically controlling the flow of fluid between the same and the low pressure chamber, and means for manually operating said controlling means.

21. In a power transmitting system employing a pump for supplying a motive fluid under pressure to a plurality of motors to be driven, a high pressure chamber in communication with the pump outlet, a low pressure chamber in communication with the pump inlet, each of said chambers containing a body of motive fluid and a superposed body of air under pressure, supply conductors for conducting motive fluid from the high pressure chamber to the respective motors, return conductors for returning spent motive fluid from the respective motors to the low pressure chamber, a valve controlling communication between the chambers, a device in communication with and operated at a predetermined pressure in the high pressure chamber for automatically opening the valve to different degrees responsive to different degrees of pressure, spring means for normally maintaining said device in position to hold the valve closed, and manually operable means for compressing said spring means and increasing its resistance to a valve opening movement of said device.

GEORGE W. WILKIN.

REFERENCES CITED

The following references are of record in the file of this patent:

UNITED STATES PATENTS

| Number | Name | Date |
|---|---|---|
| 711,662 | Herdman | Oct. 21, 1902 |
| 788,848 | Riegel | May 2, 1905 |
| 884,812 | Gillmor | Apr. 14, 1908 |
| 1,008,202 | Schmucker | Nov. 7, 1911 |
| 1,036,119 | Hughes | Aug. 20, 1912 |
| 1,099,161 | Brown | June 9, 1914 |
| 1,145,317 | Killman | July 6, 1915 |
| 1,172,802 | Keene | Feb. 22, 1916 |
| 1,207,306 | Lestak | Dec. 5, 1916 |
| 1,242,033 | Painter | Oct. 2, 1917 |
| 1,343,749 | Reton | June 15, 1920 |
| 1,385,840 | Manly | July 26, 1921 |
| 1,573,354 | Methlin | Feb. 16, 1926 |
| 1,682,776 | Crabb | Sept. 4, 1928 |
| 1,754,181 | Saccaggio | Apr. 8, 1930 |
| 1,803,932 | Dooley | May 5, 1931 |
| 1,837,714 | Jaworowski | Dec. 22, 1931 |
| 1,838,733 | Beattie | Dec. 29, 1931 |
| 1,881,471 | Gerling | Oct. 11, 1932 |
| 2,052,419 | Moore | Aug. 25, 1936 |
| 2,097,881 | Hopkins | Nov. 2, 1937 |
| 2,149,326 | Wilkin | May 7, 1939 |
| 2,185,015 | Low | Dec. 26, 1939 |
| 2,291,578 | Johnson | July 28, 1942 |

FOREIGN PATENTS

| Number | Country | Date |
|---|---|---|
| 511,495 | Germany | Oct. 30, 1930 |